June 11, 1929. A. GODEL 1,717,103
PROCESS AND APPARATUS FOR THE SEPARATION AND RECOVERY
OF GASES AND VAPORS BY SOLID ABSORBENTS
Filed June 23, 1926 3 Sheets-Sheet 1
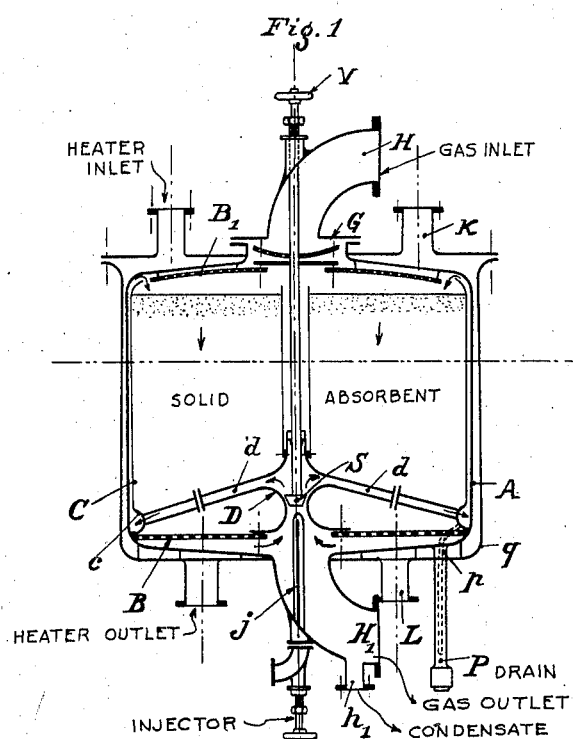
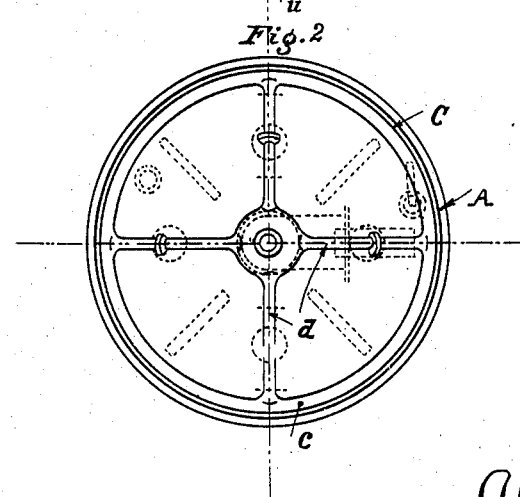
Inventor:—
Albert Godel,
By: Smith & Michael,
Attorneys.

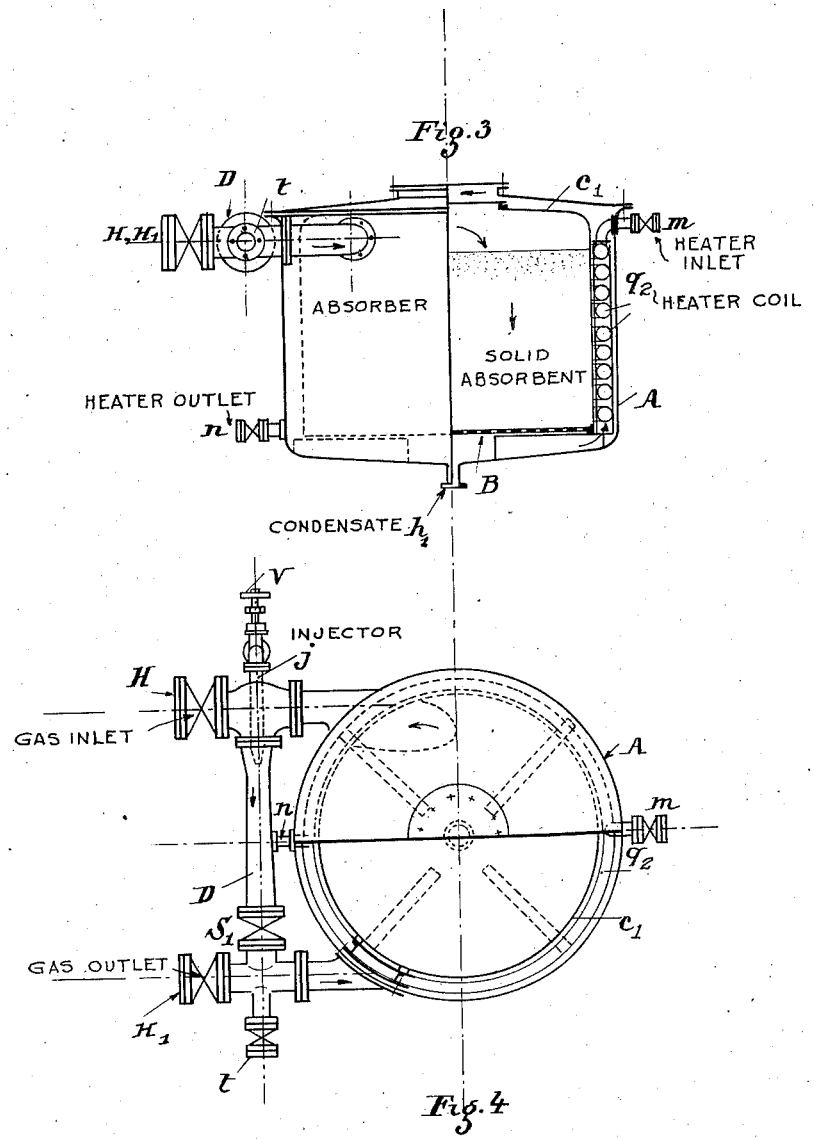

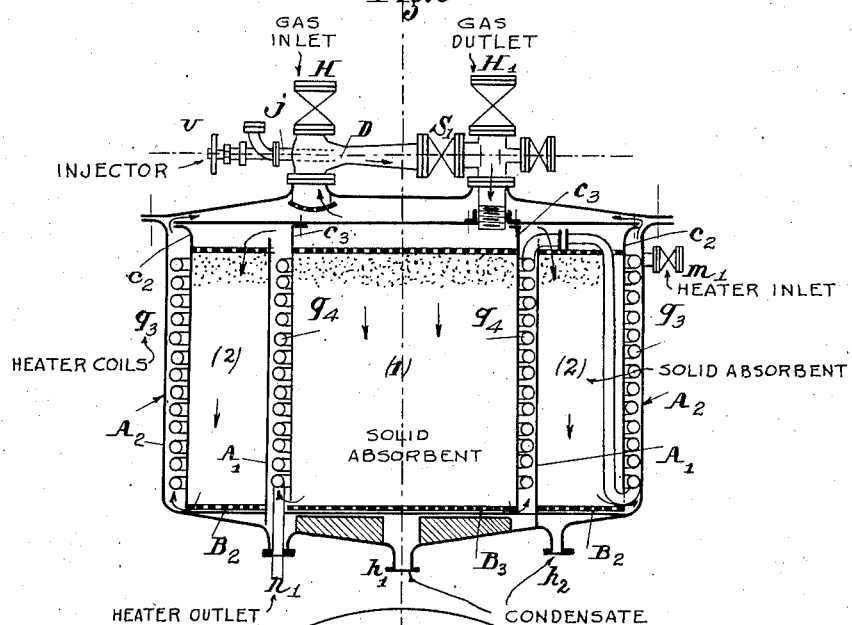

Patented June 11, 1929.

1,717,103

UNITED STATES PATENT OFFICE.

ALBERT GODEL, OF LAGNIEU, FRANCE, ASSIGNOR TO SOCIÉTÉ, DE RECHERCHES ET D'EXPLOITATIONS PETROLIFERES, OF PARIS, FRANCE, A FRENCH SOCIÉTÉ ANONYME.

PROCESS AND APPARATUS FOR THE SEPARATION AND RECOVERY OF GASES AND VAPORS BY SOLID ABSORBENTS.

Application filed June 23, 1926, Serial No. 118,007, and in Germany June 8, 1926.

This invention relates to the separation and recovery of gases and vapors by solid absorbents.

A process in common use for the recovery of gases or vapors, consists in the alternate circulation of the gas to be treated and of steam, either superheated or not, in special apparatus termed absorbers or absorption-filters, containing solid absorbent substances, in particular absorbent carbon or charcoal.

In the first place, the gaseous mixture to be treated is admitted to the filter and the absorbent substance becomes saturated with the volatile product, gas or vapor, which is the object of the recovery process. This operation is termed the absorption period.

As soon as the saturation is sufficient, the circulation of the gas to be treated is stopped and the absorber is isolated.

The absorbent mass is then heated for the distillation of the absorbed product; this treatment is known as regeneration. This distillation is assisted or caused by the introduction of steam, either superheated or not, into the same absorber apparatus. This steam displaces the gases or vapors previously retained by the absorbent substance.

The steam introduced into the filter condenses first of all in heating the absorbent mass, which becomes impregnated with the water so formed and therefore becomes moist. The absorbent substance is likewise moistened by the steam serving to displace the volatile product previously absorbed. Now it is generally necessary to dry the said absorbent mass as completely as possible before being able to utilize it for a fresh absorption.

This drying of the absorbent mass can be effected according to known methods by superheated steam or by hot air. Gas already treated in another absorber and then heated can likewise be utilized. In any case, however, the drying of the absorbent mass is a costly operation, consuming in the case of steam a large number of heat units, for only the superheat of this steam is available for the drying, that is to say the latent heat of the steam is excluded.

It is therefore advantageous to reduce to the minimum the quantity of steam condensed for the heating of the carbon mass. Such reduction of the steam consumption constitutes the main object of the present invention.

Various processes have already been proposed for attaining this object by effecting the preliminary heating of the absorbent to above 100° C. before any injection of steam; this diminishes the subsequent condensation of steam in the said absorbent.

In particular, methods are known in which a nest of tubes adapted to be heated by steam is enclosed in the absorbent mass. The absorbent substance can also be heated in the same manner by means of hot gases or the like.

But the thermal conductivity of the absorbents generally utilized is low and the transmission of the heat derived from the nest of tubes is very slow; consequently, such heating by thermal conduction is inefficient. It is moreover irregular, for the absorbent which is far distant from the heating walls is much less strongly heated than that which is in contact with the said walls; this may lead to the drawback of causing a cracking of the products absorbed in the absorbent itself, if it is necessary to raise the latter to too high a temperature. The present invention has also for its object to afford very regular heating of the absorbent mass, so as to avoid such cracking of the products.

Moreover, the use of coils or nests of tubes enclosed in the absorbent mass presents numerous disadvantages; difficulty of repairs, mechanical wear of the absorbent by the expansional movements of the coils, and so on. A further object of the invention is to avoid these disadvantages.

The present invention consists then in effecting the preliminary heating of the absorbent mass contained in the filters, not by "thermal conduction" as in the above case but by "thermal convection" and by the aid of gaseous currents circulating artificially in the absorbent mass in order to convey the heat units derived from the heating surfaces.

These heating surfaces may be formed by the actual walls of the absorber, which will then be of the jacketed type, or again by steam coils, electrical resistances, or the like suitably arranged in the path of the gases travelling in closed circulation.

In accordance with the above explained general principles, it is possible to construct various apparatus responding to each particular use in question.

The accompanying drawings represent three types of apparatus constructed in accordance with the invention; it is evident that other types of apparatus can be proposed without departing from the scope of the invention, provided that they utlize the above mentioned general principles.

Figures 1 and 2 represent in section and in plan an absorber in which the inlet and the outlet for the gas are located upon the upper and lower ends or covers of the apparatus.

Figures 3 and 4 represent an absorber in which the inlet and the outlet of the gas are arranged laterally.

Figures 5 and 6 represent an absorber in which the inlet and outlet of the gas are arranged in the top cover of the apparatus.

Figures 1 and 2 show an absorber with the gas inlet and outlet vertically in line, this apparatus being therefore well adapted for an installation in which the absorbers are sufficiently raised above the ground, upon a platform or floor, for example, on an intermediate floor of a building.

The improved filter or absorber apparatus is constituted by a preferably cylindrical vessel A, fluid tight as regards gases and steam, and intended to contain the absorbent substance; this substance is arranged on a grid B forming a false bottom. The absorbent substance is not in direct contact with the wall of the vessel A; it is retained a certain distance from this wall by a cage or liner C of thin sheet metal, of the same shape as the said vessel A.

The top edge of the cage C is level with an upper grid $B_1$; communication is therefore allowed between the internal capacity in which the absorbent substance is packed and the annular space included between the cage C and the vessel A.

The convection movements of the gas inside the absorber or its artificial circulation in closed circuit through the absorbent mass may be produced by any suitable means, such as a fan, blower, gas-injector or steam-injector.

One of the methods recommended for carrying out the invention consists in the use of steam injectors, the mechanical simplicity of which is a great advantage; there may also be utilized alternatively, a turbine directly coupled to a fan or the like. As shown in Figure 1, the cage C connects at its lower end, with a trough or gutter $c$ into which there open a number of pipes $d$ connecting with the cone D of a steam injector $j$, controllable from the exterior by a needle valve with regulator wheel $u$; the opening of the cone D can be obstructed by a disc valve S which can be operated from the exterior by a hand-wheel V.

The vessel A is enclosed by a casing $q$ covered or lagged with heat-retaining material and provided with pipe connections K and L for the introduction and the discharge of a calorific product of any kind, which will consist usually of hot gases from a combustion furnace.

The absorber proper, viz the vessel A, is completed at its upper end by a man-hole cover G provided with a pipe-connection H for the entrance of the gases or vapors and at its lower end by a pipe connection $H_1$ intended for the discharge of the gas, this fitting also having a branch pipe $h_1$ for the discharge of steam or condensation.

Lastly, the gutter $c$ has connected thereto a drain tube $p$ of which the lower end opens into a small container P fixed upon the bottom of the vessel A and in communication with the latter; this container P, when filled with water, constitutes an automatic drain for discharging any condensation which may collect in the gutter.

The operation of this improved apparatus is as follows:—

With the absorbent material in place, the gas to be treated will be admitted through the pipe H, circulating for example downwardly through the apparatus, and will escape through the pipe $H_1$ after having passed through the absorbent substance. During this circulation of the gas, care must be taken to close the valve S. When the absorbent substance is sufficiently saturated with the product to be recovered, the passage of the gas to be treated is stopped.

The calorific fluid is then introduced through the connections K into the annular space included between the casing $q$ and the wall of the vessel A. This fluid escapes through the connection L, and the wall of the vessel A is progressively heated.

It is to be noted that it is possible to begin the heating of the absorber before stopping the internal circulation of the gas to be treated, because the heating of the absorbent substance, which is not in direct contact with the wall of the vessel A, is not appreciable or in any case not sufficient to interfere with the absorption.

The wall of the vessel having been raised to the desired temperature, for example 250° C., steam under pressure, and either superheated or not, is admitted into the injector $j$, the valve S being also opened.

The steam injected at $j$ carries with it by its momentum the gas drawn from beneath the grid B and delivers it through the pipes $d$ into the annular space comprised between the vessel A and the internal cage C; this mixture of a high proportion of gas and a small amount of steam becomes superheated in contact with the wall of the vessel A and then traverses in a downward direction the whole interior of the apparatus, in which it comes into contact with the absorbent material; eventually, after giving up its heat to this material it arrives beneath the grid B from whence it is again drawn by the superheating injector, this circulation continuing in the path indicated by the arrows in Figure 1.

There is thus produced a very efficient transfer of heat by convection between the hot walls of the vessel A and the absorbent substance, this latter becoming rapidly heated without measurable humidification because the quantity of steam to be injected is exceedingly low, namely about 5% of the gas set in motion by the injector $j$ if the steam pressure is sufficient.

A part of the mixture of gas and steam in excess, as well as the vapors evolved at the commencement of distillation from the absorbent product will escape through the pipe $h_1$ which is at this moment placed in communication with a refrigerating condenser for collecting the distilled product. The absorbent substance attains rapidly a temperature of 100° C. or more, while remaining sufficiently dry.

There can then be injected directly through the connection H the superheated steam intended for displacing the product absorbed and for drying the slightly moist absorbent mass. Alternatively, the necessary excess of steam, superheated or not, can be admitted through the injector $j$ by opening the latter to a further extent; advantage will thus be derived from the heat given up by the jacket $q$ so that it becomes unnecessary to superheat the steam, the wall of the vessel A performing to a certain extent the function of superheater both of the gas and of the steam.

The construction and the arrangement of the improved apparatus thus allow the suppression of any special steam superheater.

When the absorbent substance has given up the product to be recovered and has been sufficiently dried by the injection of superheated steam at H or simply by the circulation of the superheated mixture of steam and gas by means of the injector, the admission of steam is cut off, the valve S is closed and the circulation of gas to be treated is reestablished, this gas entering at H and leaving at $H_1$.

The gas passes through the absorbent substance, drying it and cooling it. Air or gases already treated might also be circulated through the absorbent substance.

If it is desired to complete the drying operation, the gases may with advantage be heated before their introduction into the absorber.

After the drying operation is terminated, the absorbent mass may be cooled by a circulation of air or of treated and cooled gas. During this last operation, the passage of the calorific fluid into the jacket casing will be stopped and cold water circulation may be substituted therefor.

It is to be noted that, according to the invention, there is introduced into the convection circuit of the gases no foreign gas, hot or cold, apart from steam; such gases would, in effect, have the disadvantage of diluting the vapors of the product to be distilled from the absorbent and therefore of rendering their condensation difficult and increasing the losses. Steam does not present this disadvantage and may therefore be employed as injection fluid since it can afterwards be condensed at the same time as the products distilled from the absorbent.

Figures 3 and 4 represent an absorber with lateral gas connections. An absorber of this kind presents the advantage of being conveniently disposed even at ground level, without it being necessary to raise it up or to sink a pit below it.

The improved filter or absorber apparatus is constituted by a vessel A preferably cylindrical, fluid tight to gas and steam, and intended to contain the absorbent substance, which is arranged upon a grid B forming a false bottom.

The absorbent substance does not come into direct contact with the wall of the vessel A; it is retained at a certain distance from this wall by a cage $C_1$ of thin sheet metal, fitting in the shape of a bell inside the said vessel. The cage or bell $C_1$ rests upon the grid B and therefore allows free communication between the internal capacity in which the absorbent substance is packed, and the annular space included between the cage $C_1$ and the vessel A. This annular space is occupied by a coiled pipe $q_2$ with very closely spaced coils or by several pipe coils $q_2$, of which the two ends $m$ and $n$ are in communication with the exterior.

The admission of gas into the absorber takes place through the pipe connection H which delivers into the absorber above the bell $C_1$.

The outlet of gas takes place by the connection $H_1$ which is in communication with the interior of the bell $C_1$, as indicated in the sectional lower half of Figure 4.

A valve $S_1$ allows the opening and the closing of the cone D of the steam injector $j$ connecting the inlet and outlet gas pipes.

The vessel A is carefully lagged with heat-retaining material.

The absorber carries at its base a pipe connection $h_1$ for the discharge of vapors or condensate towards the refrigerating condenser; this connection is likewise provided with a valve, not shown in the drawing.

The operation of the improved apparatus is as follows:—

The absorbent substance being in place, the gas to be treated is admitted by the pipe connection H and circulates downwardly over the coil $q_2$, then rising again through the absorbent substance and escaping by the pipe connection $H_1$; during this circulation of the gas, care must be taken to close the valve $S_1$ forming a bypass.

When the absorbent material is sufficiently saturated with the product to be recovered, the passage of the gas to be treated is stopped.

Steam under pressure is then introduced into the coil $q_2$ at the point $m$ and condensation is discharged at the point $n$. Then, while keeping the valve $S_1$ closed, steam is injected at $j$. This steam flows over the top of the bell or cage $C_1$ and heats said bell as well as the wall of the vessel A in its condensation, the water formed escaping from the base of the absorber without wetting the absorbent substance, the condensation water and the gas displaced by the steam are discharged through the pipe $h_1$ in communication with the refrigerating condenser.

When all the metallic parts of the absorber have thus been raised to 100° C. the valve $S_1$ is opened to allow the circulation of the gases through the injector.

A gaseous current is thereby established as indicated by the arrows in Figures 3 and 4, the current passing through the absorbent material in a downward direction, rising again through the annular space around the bell and over the heating coil $q_2$, thence returning to the injector, and so on. There will in this way be produced a very rapid transfer of heat units from the coil, which may be at 150 or 200° C., into the very heart or center of the absorbent substance. The latter rapidly attains the temperature of 100° C. without appreciable humidification and it commences to distil off the absorbed product. A part of the mixture of gas and steam in excess, as well as the vapors arising from the initial distillation of the absorbed product, will escape from the pipe connection $h_1$ communicating with the refrigerating condenser. In order to accelerate the operation of distillation, steam, either superheated or not, may be injected directly through the valve $t$.

It may however be preferred to inject the whole of the necessary steam through the injector $j$ without other use of direct steam; in this way advantage will be taken of the heat units given up by the coil $q_2$ so that it may be unnecessary to superheat the steam employed, the coil $q_2$ acting as superheater of both gas and steam.

The construction and arrangement of the improved apparatus thus allow of dispensing with any special steam superheater.

When the absorbent substance has given up the product to be recovered, and has been sufficiently dried by the injection of superheated steam at $t$, or simply by the circulation of the superheated mixture of steam and gas by means of the injector, the admisison of steam is cut off, the valve $S_1$ is closed and the circulation of the gas to be treated is re-established, this gas entering at H and leaving at $H_1$. The gas passes through the absorbent substance, drying and cooling the latter.

Air or gases already treated might also be circulated through the absorbent mass for drying purposes.

If it is desired to complete the drying operation, the steam heating of the coils may with advantage be continued during this circulation of air or gases; in this way the drying fluid will be heated before its introduction into the absorber and will be able to dry the absorbent material under favourable conditions.

After the drying operation is terminated, the absorbent mass may likewise be cooled by a circulation of air or of gas, the coil $q_2$ being however cooled by a current of water.

The circulation of cold water in the coil might likewise with advantage be continued during the absorption passage of the gas to be treated if this gas were insufficiently cooled or charged with moisture; the cooler would then act the part of a refrigerating condenser, therefore drying the said gas and allowing a better absorption of the products to be recovered.

Figures 5 and 6 represent an absorber with gas inlet and outlet in the top cover of the apparatus.

An absorber of this kind, providing two compartments, is especially intended for the absorption of "rich gases" developing sensible heat upon absorption, such as certain petroleum gases with a high content of gasoline.

The improved filter or absorber apparatus is constituted by a vessel $A_2$, preferably cylindrical, fluid tight to gas or steam and intended to contain an absorbent substance, which is arranged upon an annular grid $B_2$ and an inner circular grid $B_3$ forming a false bottom. The absorbent substance is not in direct contact with the wall of the vessel $A_2$; it is contained in two concentric compartments formed by two juxtaposed bells $C_2$ $C_3$ of thin sheet metal, the outer bell $C_2$ of annular shape being inside the vessel $A_2$ and the other bell $C_3$ of cylindrical shape being inside an inner cylinder $A_1$, which is welded to the vessel $A_2$ at its base.

The bell $C_2$ rests upon the grid $B_2$, and the bell $C_3$ rests upon the grid $B_3$. There is therefore a free circulation as indicated by the arrows in Figure 5 between the inner capacity (1), inside the bell $C_3$ and the annular space between the bell $C_2$ and the vessel $A_2$, by passing through the annular space between $C_3$ and $A_1$ and through the interior of the bell $C_2$, that is to say through the second absorbent mass (2) located inside this outer bell.

The annular spaces betwen $A_2$ and $C_2$ and between $A_1$ and $C_3$ are occupied respectively by coils $q_3$ $q_4$ which may be connected together as shown in Figure 5. The two extremities $m_1$ $n_1$ of the said coils are in communication with the exterior.

The admission of the gas into the absorber takes place through the connection H which delivers above the outer bell $C_2$.

The exit of the gas takes place through the connection $H_1$ which is in communication with the interior of the inner bell $C_3$.

A valve $S_1$ allows the opening or the closing of the cone D of the injector $j$ connecting the gas inlet and outlet pipes.

The vessel $A_2$ is thoroughly lagged with heat-retaining material.

The absorber carries at its base a pipe connection $h_1$ for the discharge of vapors or condensations to the refrigerating condenser.

A pipe connection $h_2$ allows the discharge into a drain for condensates which may flow from the first absorbent mass.

It will be understood from the preceding decription that the operation of this apparatus and its method of working are identical with those of the apparatus previously described. The only difference consists in the fact that the absorbent mass is divided into two chambers (1) and (2) arranged in series; by this device therefore the same conditions will obtain as if the height of the absorbing column were double that of the absorber. For the regeneration, on the contrary, all the advantages found in comparatively low absorbing columns will be experienced; uniformity of heating; ready discharge of condensates, etc. But the principal advantage of the improved apparatus resides in the possibility of treating "rich gases" developing heat upon absorption.

In fact, if the gas leaving the first absorbent mass (1) is considerably heated by the absorbtion, it can be cooled by the coil $q_4$ so as to serve for a satisfactory absorption in the second absorbent mass (2).

If the gas to be treated were of a richness such that it developed heat also in the second absorbent mass, it would be easy to provide in accordance with the same principle an absorber having three, four or more absorption chambers; for this it would only be necessary to employ a triple, quadruple or multiple bell instead of a double bell; these bells would fit in an equal number of cylinders connected to the bottom of the absorber.

What I claim is:—

1. A process for the recovery of gases or vapors by means of solid absorbents, characterized in that the regeneration of the absorbent by heat is effected in two distinct periods, the first period having for its object the heating of the absorbent mass, without appreciable humidification, by the aid of convection currents created in the gas within said mass, and the second period having for its object the distillation of the absorbent product by introduction of steam.

2. A process for the recovery of gases or vapors by means of solid absorbents, characterized in that the preliminary heating of the absorbent mass in the regeneration stage is effected by the employment of convection currents created in the gas contained in the absorber, these currents circulating artificially between the absorbent mass and suitable heating surfaces in the absorber.

3. A process for the recovery of volatile products by solid absorbents, comprising an absorption and a regeneration, said regeneration being effected in two distinct periods, the first period including the heating of the absorbent mass by convection currents artificially created in the gas contained in the absorber.

4. A process for the recovery of volatile products by solid absorbents, comprising an absorption and a regeneration, said regeneration being effected in two distinct periods, the first period including the heating of the absorbent mass by convection currents artificially created in the gas contained in the absorber, and the second period including the distillation of the absorbed product by introduction of steam, said convection currents being maintained during said second period.

5. A process for the recovery of volatile products by solid absorbents, comprising an absorption and a regeneration, said regeneration being effected in two distinct periods, the first period including the heating of the absorbent mass by convection currents artificially created in the gas contained in the absorber, and the second period including the distillation of the absorbed product by introduction of steam, said convection currents being maintained during said second period, and said steam being superheated as a result of said maintained convection currents.

6. A process for the recovery of volatile products by solid absorbents, comprising an absorption and a regeneration, said regeneration being effected in two distinct periods, the first period including the heating of the absorbent mass by convection currents artificially created in the gas contained in the absorber, and the second period including the distillation of the absorbed product by introduction of superheated steam, said convection currents being maintained during said second period.

7. A process for the recovery of gases and vapors by solid absorbents, comprising an absorption and a regeneration, said absorption being carried out in a series of stages with intermediate cooling of the gas under treatment, and said regeneration being effected in two distinct periods, the first period including the heating of the absorbent mass by convection currents created in the gas contained in the absorber, and the second period including the distillation of the absorbed product.

8. Apparatus for the recovery of volatile products by solid absorbents, comprising an absorber vessel, means for circulating through said vessel the gas to be treated for said recovery, means for interrupting the circulation of said gas, means for producing an artificial circulation of the gas remaining in said vessel, and means for introducing steam into said vessel.

9. Apparatus for the recovery of volatile products by solid absorbents, comprising an absorber vessel, means for circulating through said vessel the gas to be treated for said recovery, means for interrupting the circulation of said gas, said vessel comprising heating surfaces, means for producing an artificial circulation of the gas remaining in said vessel, said remaining gas being thereby brought into contact with said heating surfaces, and means for introducing steam into said vessel.

10. Apparatus for the recovery of volatile products by solid absorbents, comprising an absorber vessel, means for circulating through said vessel the gas to be treated for said recovery, means for interrupting the circulation of said gas, means for producing an artificial circulation of the gas remaining in said vessel, means for regulating the temperature of said remaining gas in the course of its circulation, and means for introducing steam into said vessel.

11. Apparatus for the recovery of gases and vapors by solid absorbents, comprising a closed vessel containing an absorbent mass, means for circulating through said vessel and over said absorbent mass the gas to be treated for said recovery, means for interrupting the circulation of said gas, heat exchange surfaces included in said vessel but out of contact with said absorbent mass, means for creating an artificial circulation of the gas remaining in said vessel, said circulation bringing said remaining gas into contact alternately with said absorbent mass and with said heat-exchange surfaces, and means for introducing steam into said vessel.

12. Apparatus for the recovery of gases and vapors by solid absorbents comprising a closed vessel containing absorbent masses in separate chambers, means for circulating through said vessel and over said absorbent masses the gas to be treated for said recovery, means for interrupting the circulation of said gas, heat-exchange surfaces included between said separate chambers in said vessel but out of contact with said absorbent masses, means for creating an artificial circulation of the gas remaining in said vessel, said circulation bringing said remaining gas into contact alternately with said absorbent masses in said separate chambers, and with said heat-exchange surfaces, and means for introducing steam into said vessel.

13. Apparatus for the recovery of volatile products by solid absorbents, comprising an absorber vessel, means for circulating through said vessel the gas to be treated for said recovery, means for introducing steam into said vessel, said gas-circulating and steam-introducing means operating in different stages of said recovery, means for creating an artificial circulation of the fluid contained in said vessel, and means for regulating the temperature of the fluid circulating in said vessel.

14. Apparatus for the recovery of volatile products by solid absorbents, comprising an absorber vessel, means for circulating through said vessel the gas to be treated for said recovery, means for introducing steam into said vessel, said gas-circulating and steam-introducing means operating in different stages of said recovery, means for creating an artificial circulation of the fluid contained in said vessel, and means for regulating the temperature of the fluid circulating in said vessel, said temperature regulating means serving as superheater of fluid during said artificial circulation.

15. Apparatus for the recovery of volatile products by solid absorbents, comprising an absorber vessel, means for circulating through said vessel the gas to be treated for said recovery, means for introducing steam into said vessel, said gas-circulating and steam-introducing means operating in different stages of said recovery, means for creating an artificial circulation of the fluid contained in said vessel, and means for regulating the temperature of the fluid circulating in said vessel, said temperature regulating means having no direct contact with the solid absorbent contained in said vessel.

16. Apparatus for the recovery of volatile products by solid absorbents, comprising an absorber vessel, means for circulating through said vessel the gas to be treated for said recovery, means for introducing steam into said vessel, said gas-circulating and steam-introducing means operating in different stages of said recovery, means for creating an artificial circulation of the fluid contained in said vessel, and means for regulating the temperature of the fluid circulating in said vessel, said temperature regulating means serving alternately for cooling the circulating fluid during the absorption stage of said recovery and for superheating fluid during said artificial circulation.

In testimony whereof I hereunto affix my signature.

ALBERT GODEL.